US009896309B2

(12) United States Patent
Wang et al.

(10) Patent No.: US 9,896,309 B2
(45) Date of Patent: Feb. 20, 2018

(54) OBJECT DETECTOR, AND METHOD FOR CONTROLLING A PASSENGER CONVEYOR SYSTEM USING THE SAME

(71) Applicant: Otis Elevator Company, Farmington, CT (US)

(72) Inventors: Hongcheng Wang, Farmington, CT (US); Arthur Hsu, South Glastonbury, CT (US); Hui Fang, Shanghai (CN)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 15/302,263

(22) PCT Filed: May 6, 2015

(86) PCT No.: PCT/US2015/029482
§ 371 (c)(1),
(2) Date: Oct. 6, 2016

(87) PCT Pub. No.: WO2015/171774
PCT Pub. Date: Nov. 12, 2015

(65) Prior Publication Data
US 2017/0043982 A1 Feb. 16, 2017

Related U.S. Application Data

(60) Provisional application No. 61/989,213, filed on May 6, 2014.

(51) Int. Cl.
*B66B 25/00* (2006.01)
*G01V 8/12* (2006.01)
*B66B 27/00* (2006.01)

(52) U.S. Cl.
CPC .............. *B66B 25/00* (2013.01); *B66B 27/00* (2013.01); *G01V 8/12* (2013.01)

(58) Field of Classification Search
CPC ..... B66B 25/00; B66B 25/003; B66B 29/005; B66B 27/00; G01V 8/12
See application file for complete search history.

(56) References Cited

U.S. PATENT DOCUMENTS

| | | | |
|---|---|---|---|
| 4,748,394 A | 5/1988 | Watanabe | |
| 5,149,921 A | 9/1992 | Picado | |
| 5,698,824 A * | 12/1997 | Platt | B66B 13/26 187/317 |
| 5,923,005 A * | 7/1999 | Blondiau | B66B 25/00 187/317 |
| 6,049,189 A | 4/2000 | Markus et al. | |

(Continued)

FOREIGN PATENT DOCUMENTS

| | | |
|---|---|---|
| JP | 2004037274 | 2/2004 |
| JP | 2014016742 | 1/2014 |

(Continued)

OTHER PUBLICATIONS

European Patent Office, "Patent Translate Description JP2014016742", Jun. 2017.*

(Continued)

*Primary Examiner* — Mark A Deuble
(74) *Attorney, Agent, or Firm* — O'Shea Getz P.C.

(57) ABSTRACT

A passenger detector (10) for use in a passenger conveyor system (12) is provided that includes a structured light source (34), a structured light detector (36), and a controller (38). The structured light source (34) is operable to project light (40) into a detection area (32) in a predetermined projected pattern. The structured light detector (36) is operable to generate reflected light signals indicative of light (40) reflected back toward the structured light detector (36) from the detection area (32). The controller (38) is operable to receive the reflected light signals from the structured light detector (36), and operable to process the reflected light signals to make a determination as to whether a passenger is disposed within a detection area (32).

26 Claims, 3 Drawing Sheets

(56) References Cited

U.S. PATENT DOCUMENTS

| | | | |
|---|---|---|---|
| 6,334,522 B2 * | 1/2002 | Haruta | B66B 25/00 198/322 |
| 6,600,509 B1 | 7/2003 | Radford et al. | |
| 7,034,280 B2 | 4/2006 | Beck et al. | |
| 7,404,476 B2 * | 7/2008 | Yoshida | B66B 29/04 198/322 |
| 7,767,954 B2 | 8/2010 | Pirkl | |
| 7,775,339 B2 * | 8/2010 | Ogimura | B66B 27/00 198/323 |
| 9,272,882 B2 * | 3/2016 | Soldner | B66B 25/00 |
| 2001/0002644 A1 | 6/2001 | Haruta et al. | |
| 2005/0088520 A1 * | 4/2005 | Wiesinger | B66B 27/00 348/143 |
| 2005/0121288 A1 | 6/2005 | Blondiau et al. | |
| 2013/0233672 A1 | 9/2013 | Simola et al. | |

FOREIGN PATENT DOCUMENTS

| | | | |
|---|---|---|---|
| JP | 2014016742 A | * | 1/2014 |
| WO | 2015023278 | | 2/2015 |

OTHER PUBLICATIONS

Wikipedia, "Time-of-flight camera", Apr. 2013.*
McFarland, "One day an elevator might ask—Are you getting on?", The Washington Post—Innovations, Jan. 2014.
"Kinect", Wikipedia, the free encyclopedia, Jan. 2014.

* cited by examiner

OBJECT DETECTOR, AND METHOD FOR CONTROLLING A PASSENGER CONVEYOR SYSTEM USING THE SAME

This application claims priority to PCT Patent Application No. PCT/US2015/029482 filed May 6, 2015, which claims priority to U.S. Provisional Patent Application Ser. No. 61/989,213 filed May 6, 2014, which are hereby incorporated herein by reference in their entireties.

BACKGROUND

1. Technical Field

Aspects of the present invention relate to an object detector, and more particularly relate to an object detector for use in a passenger conveyor system, wherein the object detector uses structured light to make a determination as to whether a passenger is disposed within a detection area.

2. Background Information

A passenger conveyor system (e.g., an escalator system, a moving sidewalk system, etc.) typically includes a passenger conveyor (e.g., a moving staircase, a moving sidewalk, etc.) that is operable to be driven by a drive machine. A passenger conveyor system typically can be operated in at least three operation modes, including: (i) a shutdown mode, in which the drive machine is powered off; (ii) a standby mode, in which the drive machine is powered on but is not driving the passenger conveyor, or is driving the passenger conveyor at slow speed; and (iii) a running mode, in which the drive machine is powered on and is driving the passenger conveyor. In some instances, a passenger conveyor system is continuously operated in a running mode, even when there are no passengers on the passenger conveyor. This can cause a significant amount of energy to be wasted. In some instances, a passenger conveyor system is continuously operated in a running mode because it lacks the ability to automatically switch between the various operation modes. To eliminate the need for manual switching between the various operation modes, safety codes (e.g., EN 115) permit the use of devices for automatically switching between the various operation modes. However, because it can be dangerous to switch between the various operation modes when a passenger is present on the passenger conveyor, safety codes require that those devices be operable to make a determination, with near absolute certainty, as to whether a passenger is present on the passenger conveyor. Devices have been developed that can make such a determination with sufficiently high certainty to comply with safety codes; however, those devices can be prohibitively expensive. Further, it would be desirable to be able to automatically switch from a shutdown mode to a running mode, or from a standby mode to a running mode, as a passenger approaches the passenger conveyor system; however, known devices for automatically switching between the various operation modes are unable to make a determination as to whether a passenger is approaching the passenger conveyor system. Aspects of the present invention are directed to these and other problems.

SUMMARY OF ASPECTS OF THE INVENTION

According to an aspect of the present invention, a passenger detector for use in a passenger conveyor system is provided that includes a structured light source, a structured light detector, and a controller. The structured light source is operable to project light into a detection area in a predetermined projected pattern. The structured light detector is operable to generate reflected light signals indicative of light reflected back toward the structured light detector from the detection area. The controller is operable to receive the reflected light signals from the structured light detector, and operable to process the reflected light signals to make a determination as to whether a passenger is disposed within a detection area.

According to another aspect of the present invention, a method for controlling a passenger conveyor system is provided that includes the steps of: (1) projecting structured light within a detection area disposed relative to the passenger convey system; (2) detecting structured light reflect back from the detection area; (3) using detected structured light reflected back from the detection area to make a determination as to whether a passenger is disposed within the detection area; and (4) controlling an operation of the passenger conveyor system based on the determination.

According to another aspect of the present invention, an object detector is provided that includes first and second structured light sources, first and second structured light detectors, and a controller. The first and second structured light sources each are operable to project light into a detection area. The first and second structured light detectors are operable to generate reflected light signals indicative of light reflected back toward the first and second structured light detector from the detection area. The controller is operable to receive the reflected light signals from the first and second structured light detectors, and is operable to process the reflected light signals to make a determination as to whether an object is disposed within the detection area.

In addition to, or as an alternative to, one or more of the features described above, further aspects of the present invention can include one or more of the following features, individually or in combination:

the passenger conveyor system is one of an escalator system and a moving sidewalk system;

the detection area includes at least one of an area of the passenger conveyor system and an area proximate the passenger conveyor system;

the determination further indicates whether a passenger is present on the passenger conveyor system;

the determination further indicates whether a passenger disposed within the detection area is approaching the passenger conveyor system;

the determination further indicates whether a passenger disposed within the detection area is moving away from the passenger conveyor system;

the determination further indicates an intent of a passenger disposed within the detection area;

the light has at least one predetermined wavelength;

the light has predetermined wavelengths in an infrared range;

the predetermined pattern is at least one of a strip pattern, a grid pattern, and a dot pattern;

the passenger detector further comprises a camera operable to receive visible light that has been reflected from the detection area toward the camera, and operable to convert the received visible light into electrical visible light signals;

the controller is operable to process the reflected light signals received from the structured light detector to determine a reflected pattern of the light signals that have been reflected back toward the structured light detector from the detection area;

the controller is operable to compare the reflected pattern and the predetermined pattern, and is operable to generate pattern comparison information indicative thereof; and the controller is operable to analyze the pattern comparison information to make a determination as to whether a passenger is disposed within a detection area;

the step of using controlling an operation of the passenger conveyor system involves automatically switching an operation mode of the passenger conveyor system between at least one of a shutdown mode, a standby mode, and a running mode;

an interference elimination feature operable to ensure that the first structured light detector receives only light that has been projected by the first structured light source and reflected back towards the first structured light detector, and operable to ensure that the second structured light detector receives only light that has been projected by the second structured light source and reflected back towards the second structured light detector;

the interference elimination feature alternatingly activates and deactivates the first and second structured light sources at mutually exclusive time intervals;

the interference elimination feature causes each of the first and second structured light sources to project light at a different wavelength, or within a different wavelength range;

the interference elimination feature causes each of the first and second structured light sources to project having a different predetermined projection pattern; and the interference elimination feature acquires time-of-flight information of light travelling between the first and second structured light sources and the respective first and second structured light detectors.

These and other aspects of the present invention will become apparent in light of the drawings and detailed description provided below.

DETAILED DESCRIPTION OF ASPECTS OF THE INVENTION

Figure 1:
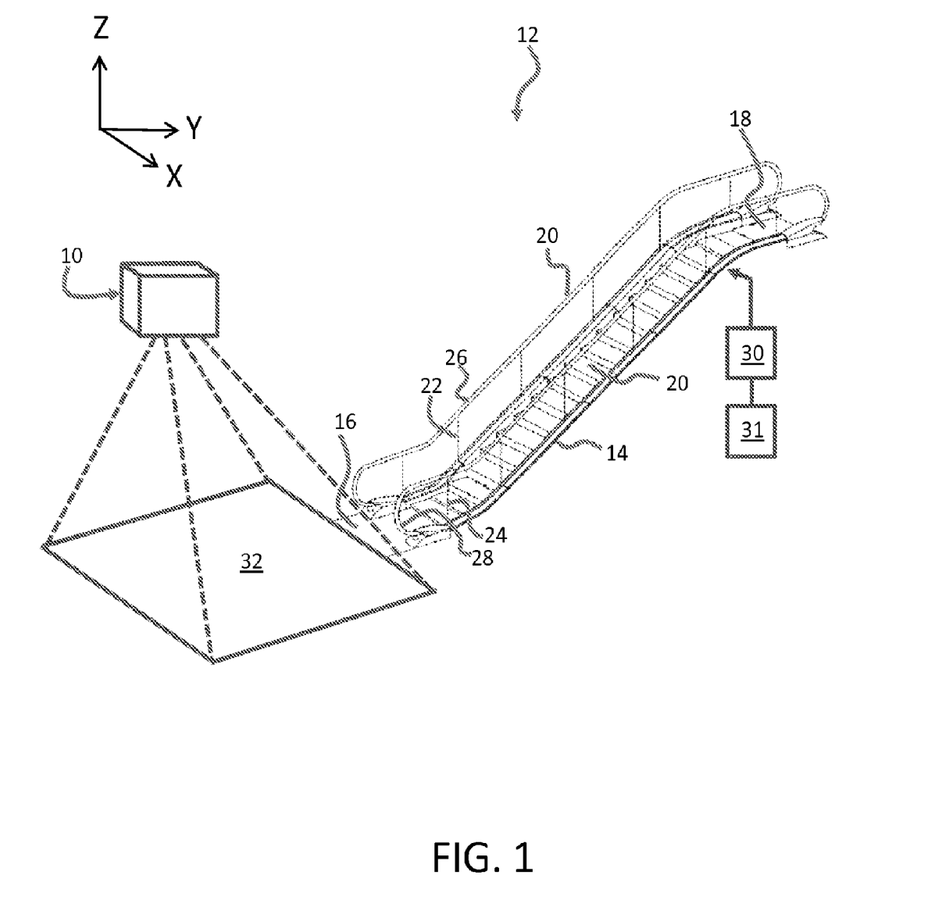
FIG. 1 illustrates a schematic perspective view of a passenger conveyor system that includes a passenger detector.
Figure 2:
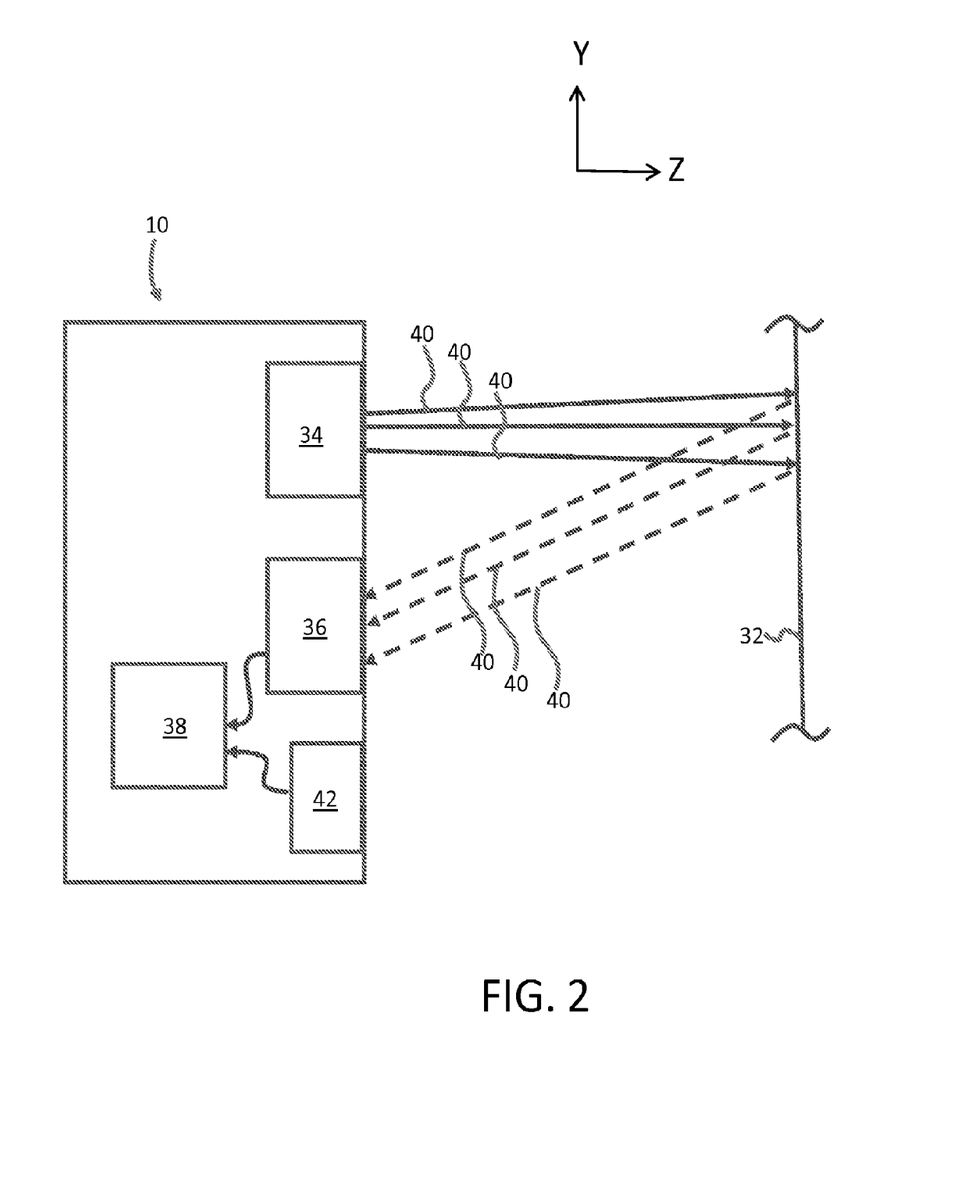
FIG. 2 illustrates a schematic plan view of the passenger detector of FIG. 1 during use.
Figure 3:
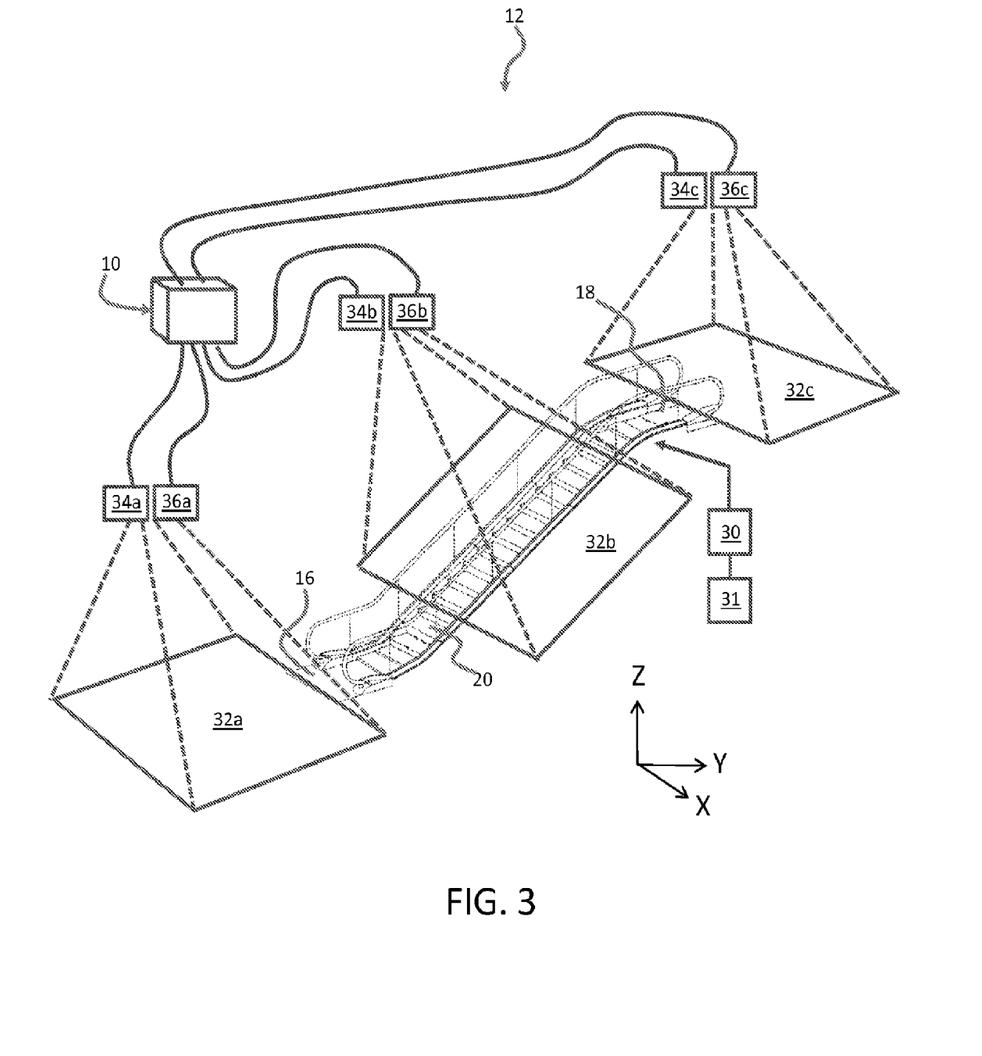
FIG. 3 illustrates a schematic perspective view of another passenger conveyor system that includes three passenger detectors.

Referring to FIGS. 1-3, the present disclosure describes embodiments of an object detector 10, and embodiments of a method for controlling a passenger conveyor system 12 (see FIGS. 1 and 3) using the object detector 10.

The present disclosure describes aspects of the present invention with reference to the embodiments illustrated in the drawings; however, aspects of the present invention are not limited to the embodiments illustrated in the drawings. The present disclosure may describe one or more features as having a length extending along an x-axis, a width extending along a y-axis, and/or a height extending along a z-axis. The drawings illustrate the respective axes.

The object detector 10 can be used various different purposes. In the illustrated embodiments, the object detector 10 is used to detect passengers of a passenger convey system 12. The term "passengers," and variations thereof, is used herein to include actual passengers and potential passengers. In other embodiments, the object detector 10 can be used to detect other objects (e.g., moving objects) in other environments with suitable ambient light conditions (e.g., indoor environments). For ease of discussion, the object detector 10 will hereinafter be referred to as the "passenger detector 10."

The passenger detector 10 can be used in various types of passenger conveyor systems 12 (e.g., escalator systems, moving sidewalk systems, elevator systems, etc.). Referring to FIGS. 1 and 2, in the illustrated embodiments, the passenger conveyor system 12 is an escalator system. For ease of discussion, the passenger conveyor system 12 will hereinafter be referred to as the "escalator system 12."

The escalator system 12 can be configured in various different ways. Referring to FIG. 1, in the illustrated embodiments, the escalator system 12 includes a truss 14 extending between a lower landing 16 and an upper landing 18; a moveable staircase 20 that is operable to be driven through a closed loop path; first and second balustrades 22, 24 that each include a handrail 26, 28 that is operable to be driven through a closed loop path; a drive machine 30 that is operable to drive the moveable staircase 20 and the handrails 26, 28; and a drive machine controller 31 that is operable to control the drive machine 30. The escalator system 12 can be operated in at least three operation modes: (i) a shutdown mode, in which the drive machine 30 is powered off; (ii) a standby mode, in which the drive machine 30 is powered on but either does not drive the moveable staircase 20 and the handrails 26, 28, or drives the moveable staircase 20 and the handrails 26, 28 at slow speed; and (iii) a running mode, in which the drive machine 30 is powered on and drives the moveable staircase 20 and the handrails 26, 28. When the escalator system 12 is operated in the shutdown mode and the standby mode, the moveable staircase 20 is stationary and thus does not convey passengers; however, the moveable staircase 20 can still function as a staircase, and thus it is possible that passengers will be present on the moveable staircase 20. When the escalator system 12 is operated in the running mode, the moveable staircase 20 is driven through the close loop path and is operable to convey passengers between the lower landing 16 and the upper landing 18.

The passenger detector 10 is operable to detect a passenger disposed within at least one detection area 32. The detection area 32 includes an area of the escalator system 12 and/or an area proximate the escalator system 12. The phrase "area proximate the escalator system 12," and variations thereof, are used herein to describe an area that is separate from, but near (e.g., adjacent to), the escalator system 12. In embodiments in which the detection area 32 is an area of the escalator system 12, the passenger detector 10 can be used to make a determination as to whether a passenger is present on the escalator system 12. In embodiments in which the detection area 32 includes an area proximate the escalator system 12, the passenger detector 10 can be used to make a determination as to whether a passenger disposed within the detection area 32 is approaching the escalator system 12 (e.g., approaching within approximately eight meters (8 m) of the escalator system 12) or is moving away from the escalator system 12. In such embodiments, the passenger detector 10 is in effect able to determine an intent of a passenger disposed with the detection area 32 (e.g., intent to approach the escalator system 12, intent to move away from the escalator system 12, intent to pass by the escalator system 12, intent to remain stationary relative to the escalator system 12, etc.). These features will be described in more detail below. Referring to FIG. 1, in the illustrated embodiment, the detection area 32 is an area proximate the lower landing 16 of the escalator system 12. In other embodiments, the detection area 32 can be an area defined by, or an area that includes, at least a portion of the lower landing 16, at least a portion of the moveable staircase 20, at least a portion of the upper landing 18, and/or an area proximate the upper landing 18.

The passenger detector 10 uses structured light to make the above-described determinations. There are various known techniques that use structured light to detect an object, including infrared structured light (IRSL) techniques, imperceptible structured light (ISL) techniques, filtered structured light (FSL) techniques. The passenger detector 10 is operable to perform one or more of these known techniques, and/or another known technique that uses structured lighting to detect an object. A person having ordinary skill in the art would be able to adapt the passenger detector 10, or one or more components thereof, to perform one or more of these known techniques without undue experimentation.

Referring to FIG. 2, the passenger detector 10 includes at least one structured light source 34, at least one structured light detector 36, and a controller 38. The structured light source 34 is operable to project (e.g., periodically project, continuously project) light 40 into the detection area 32 in a predetermined projected pattern. The structured light detector 36 is operable to generate (e.g., periodically generate, continuously generate) reflected light signals that are indicative of light 40 that has been reflected back toward the structured light detector 36 from the detection area 32. The controller 38 is operable to receive the reflected light signals from the structured light detector 36, and is operable to process the reflected light signals to make a determination as to whether a passenger is disposed within a detection area 32.

The structured light source 34 includes at least one light element (not shown) that generates the light 40. The structured light source 34 can include various different types of light elements (e.g., lasers, LEDs). In the illustrated embodiment, the structured light source 34 includes a light element that is a laser.

The light 40 can have one or more predetermined wavelengths. The predetermined wavelengths can be selected so that other light disposed relative to the escalator system 12 (e.g., ambient light, sunlight) will not significantly interfere with the light 40 projected by the structured light source 34. In the illustrated embodiments, the light 40 has wavelengths in the infrared range (e.g., between approximately 700 nm and 1000 nm). In other embodiments, the light 40 can additionally or alternatively have wavelengths in the visible range (e.g., between approximately 380 nm and 700 nm), the ultraviolet range (e.g., between approximately 10 nm and 380 nm), and/or another range on the electromagnetic spectrum. The structured light source 34 can include one or more filter elements (not shown) through which the light 40 passes in order to achieve the predetermined wavelengths.

The light 40 can be projected onto the detection area 32 in various different projected patterns, including, for example, stripe patterns, grid patterns, and/or dot patterns. In the illustrated embodiment, the projected pattern is a grid pattern. The projected patterns can be one-dimensional patterns or bi-dimensional patterns. The projected patterns can be coded patterns or un-coded patterns. The structured light source 34 can include one or more aperture elements (not shown) through which the light 40 passes in order to achieve the projected pattern. There are various known techniques for projecting the light 40 in one or more projected patterns as described herein. A person having ordinary skill in the art would be able to adapt the passenger detector 10 to perform one or more of these known techniques without undue experimentation.

The structured light detector 36 includes at least one detector element (not shown) that is operable to receive the light 40 that has been reflected back toward the structured light detector 36 from the detection area 32, and that is operable to convert that light 40 into corresponding electrical signals that are referred to herein as "reflected light signals." The structured light detector 36 can include various different types of detector elements (e.g., complementary metal-oxide-semiconductor (CMOS) sensors, charge-coupled devices (CCDs), photodiodes, phototransistors). In the illustrated embodiment, the structured light source 34 includes a detector element that is a CMOS sensor.

In some embodiments, the passenger detector 10 additionally includes a camera 42 that is operable to receive visible light that has been reflected from the detection area 32 toward the camera 42, and that is operable to convert the received visible light into corresponding electrical signals that are referred to herein as "visible light signals." The camera 42 can be an RGB camera or another type of camera that is operable to perform the functionality described herein.

The controller 38 is operable to process the reflected light signals received from the structured light detector 36 to determine a pattern (hereinafter a "reflected pattern") of the light 40 that has been reflected back toward the structured light detector 36 from the detection area 32. The controller 38 is operable to compare (e.g., periodically compare, continuously compare) the reflected pattern and the predetermined pattern, and is operable to generate pattern comparison information indicative thereof. The controller 38 is operable to analyze the pattern comparison information to provide depth information about an object (e.g., a passenger) disposed within a detection area 32, from which movement information about the object can be accurately determined. The controller 38 is operable to use the depth information and/or the movement information to make a determination, with near absolute certainty, as to whether a passenger is disposed within the detection area 32. The controller 38 can use one or more known detection algorithms in this analysis (e.g., background subtraction, shape/model based detection, machine learning, etc.). For example, in one embodiment, a depth background can be constructed first when there are no passengers in a field of view of the structured light detector 36. At a later time, if a passenger appears within the field of view of the structured light detector 36 and changes (e.g., depth differences) are detected relative to the depth background, depth information corresponding to the body area of the area will be generated. In some embodiments, some statistical method (e.g., Gaussian Mixture Models (GMM)) can be used to extract the depth background even if there are one or more moving objects in the field of view. A person having ordinary skill in the art would be able to adapt (e.g., program) the controller 38, without undue experimentation, to perform the functionality described herein.

In some embodiments, the controller 38 is further operable to use the depth information and/or the movement information to make a determination, with near absolute certainty, as to an intent of a passenger disposed within the detection area 32 (e.g., an intent to approach the escalator system 12, an intent to move away from the escalator system 12, an intent to pass by the escalator system 12, an intent to remain stationary relative to the escalator system 12, etc.). In some embodiments, this determination can be made by performing a method that involves the steps of: (1) transforming the acquired depth information and/or the movement information (e.g., transforming using one or more parameters acquired during a calibration step) so that the acquired depth information and/or the movement information corresponds with a coordinate system of the environment in which the escalator system 12 is disposed (e.g., a world coordinate system having x, y, and z coordinate axes); (2) generating tracking information relative to at least one passenger disposed within the detection area 32, using the transformed depth information and/or the transformed movement information, to determine one or more characteristics (e.g., location, speed, movement direction) of the passenger's movement; and (3) analyzing the tracking information over time in order to make a determination, with near absolute certainty, as to an intent of the passenger.

The "generating tracking information" step can involve detecting a passenger at consecutive detection frames based on the passenger's 3D positions relative to a world coordinate system. Due to a high sample rate of detection frames, the passenger can have very close 3D positions from one frame to the next. Thus, the passenger's 3D position can be used to associate the passenger across consecutive detection frames. Based on this association, the passenger's location, speed, and/or movement direction can be smoothly estimated using methods such as Kalman filtering.

The "analyzing the tracking information" step can involve use of one or more known algorithms (e.g., deep neural network, Bayesian inference, etc.). Additionally or alternatively, the "analyzing the tracking information" step can involve applying one or more pre-defined rules based on human experience and knowledge. For example, if the generated tracking information indicates that a passenger's movement speed is larger than a pre-defined threshold, and that the passenger is consistently moving toward the escalator system 12, then the controller 38 can make the determination (i.e., during the "analyzing the tracking information" step) that the passenger intends to approach the escalator system 12.

In embodiments in which the passenger detector 10 additionally includes a camera 42, the controller 38 is operable to receive the visible light signals from the camera 42, and is operable to analyze both the visible light signals and the above-described pattern comparison information to make a determination, with near absolute certainty, as to whether a passenger is disposed within the detection area 32. Again, the controller 38 can use one or more known detection algorithms.

Referring to FIG. 3, in some embodiments, the escalator system 12 includes a plurality of detection areas 32, and the passenger detector 10 is operable to detect a passenger disposed within each one of the plurality of detection areas 32. In such embodiments, the plurality of detection areas 32 can be overlapping and/or non-overlapping. In the embodiment illustrated in FIG. 3, the escalator system 12 includes a first detection area 32a, a second detection area 32b, and a third detection area 32c. The first detection area 32a is an area proximate the lower landing 16, the second detection area 32b is an area that includes a portion of the moveable staircase 20, and the third detection area 32c is an area proximate the upper landing 18.

In embodiments in which the escalator system 12 includes a plurality of detection areas 32 (see FIG. 3), the passenger detector 10 can include a plurality of structured light sources 34 and a plurality of structured light detectors 36. In the illustrated embodiment, the passenger detector 10 includes a first structured light source 34a and a first structured light detector 36a disposed relative to the first detection area 32a; a second structured light source 34b and a second structured light detector 36b disposed relative to the second detection area 32b; and a third structured light source 34c and a third structured light detector 36c disposed relative to the third detection area 32c.

In embodiments in which the passenger detector 10 includes a plurality of structured light sources 34 and a plurality of structured light detectors 36, the passenger detector 10 can include an interference elimination feature that is operable to eliminate interference there between. In the embodiment illustrated in FIG. 3, for example, an interference elimination feature could ensure that the first structured light detector 36a receives the reflected light 40 that that was initially projected by the first structured light source 34a; and ensure that the second structured light detector 36b receives the reflected light 40 that that was initially projected by the second structured light source 34b; and so on.

The interference elimination feature can be implemented in various different ways.

In a first embodiment, the interference elimination feature is implemented by alternatingly activating and deactivating the plurality of structured light sources 34 at mutually exclusive time intervals (e.g., time intervals having a duration of approximately one millisecond (1 ms)), and synchronizing the structured light detectors 36 so that each receives reflected light 40 only during time intervals when its corresponding structured light source 34 is activated.

In a second embodiment, the interference elimination feature is implemented by configuring each of the plurality of structured light sources 34 to project light 40 at a different wavelength, or within a different wavelength range; and by synchronizing the structured light detectors 36 so that each is configured to receive reflected light 40 only at the wavelength, or only within the wavelength range, of the light 40 projected from its corresponding structured light source 34. For example, in one embodiment having two structured light sources 34, the first structured light source 34 is configured to project light 40 having a wavelength of approximately eight hundred thirty nanometers (830 nm); and the second structured light source 34 is configured to project light 40 having a wavelength of approximately nine hundred nanometers (900 nm).

In a third embodiment, the interference elimination feature is implemented by configuring each of the plurality of structured light sources 34 to project light 40 having a different predetermined projection pattern; and by synchronizing the structured light detectors 36 so that each is configured to receive reflected light 40 only having the predetermined projected pattern of the light 40 projected from its corresponding structured light source 34. For example, in one embodiment having two structured light sources 34, the first structured light source 34 is configured to project light 40 having a predetermined dot pattern; and the second structured light source 34 is configured to project light 40 having a predetermined square pattern.

In a fourth embodiment, the interference elimination feature is configured to acquire time-of-flight (TOF) information of light 40 travelling between the structured light sources 34 and their corresponding structured light detectors 36. The TOF information can be used by the passenger detector 10 to aid in eliminating interference between the structured light sources 34 and between the structured light detectors 36.

As discussed above, the controller 38 is operable to make a determination as to whether a passenger is disposed within a detection area 32, and, in some embodiments, the controller 38 is operable to make a determination as to whether a passenger disposed within the detection area 32 is approaching the escalator system 12 or is moving away from the escalator system 12. The controller 38 is operable to communicate these determinations via a passenger detection signal. The passenger detection signal can be used to aid in controlling an operation of the escalator system 12. In some embodiments, the drive machine controller 31 (see FIGS. 1 and 2) is operable to receive the passenger detection signal from the controller 38, and is operable to control the drive machine 30 in response thereto. In some embodiments, the drive machine controller 31 is operable to control the drive machine 30 in response to the passenger detection signal to automatically switch the escalator system 12 between one or more operation modes (e.g., shutdown mode, standby mode, running mode). The phrase "automatically switch," and variations thereof, are used herein to indicate switching without manual input.

The controller 38 can be configured in various different ways. In some embodiments, the controller 38 can be implemented using analog and/or digital hardware (e.g., counters, switches, logic devices, memory devices, programmable processors, non-transitory computer readable storage mediums), software, firmware, or a combination thereof. The controller 38 can perform one or more of the functions described herein by executing software, which can be stored, for example, in a memory device included in the controller 38. A person having ordinary skill in the art would be able to adapt (e.g., construct, program) the controller 38 to perform the functionality described herein without undue experimentation. Although the controller 38 is described herein as being a component of the passenger detector 10, in some embodiments the controller 38, or one or more features thereof, can be implemented as a feature of a separate component of the escalator system 12 (e.g., the drive machine controller 31).

The passenger detector 10 described herein offers several significant advantages over known devices. As discussed above, known devices can be prohibitively expensive, and are unable to make a determination, with sufficient certainty, that a passenger is approaching the escalator system 12. In contrast, the passenger detector 10 can be provided at relatively low cost, and can be used to make a determination, with near absolute certainty, as to whether a passenger is approaching the escalator system 12 (e.g., approaching within approximately eight meters (8 m) of the escalator system 12).

The passenger detector 10 can be provided at relatively low cost at least in part because it can include one or more components of an off-the-shelf device that uses structured light. Other known devices can require components that are unavailable off-the-shelf, and that must be custom designed for a particular application.

The passenger detector 10 can be used to make a determination as to whether a passenger is approaching the escalator system 12 because it can generate and use the above-described depth information and/or the above-described movement information. Other devices use technologies (e.g., pairs of stereoscopic-positioned cameras, time-of-flight sensors) that do not involve structured light, and as a result: (1) they are unable to generate the depth information and/or movement information that is necessary to detect, with near absolute certainty, a passenger disposed within an area proximate the escalator system 12; and/or (2) they are prohibitively expensive.

The operation of the escalator system 12 can be controlled in various different ways using the passenger detector 10. In one embodiment, a method for controlling the escalator system 12 includes the steps of: (i) providing the passenger detector 10; (ii) using the passenger detector 10 to generate the passenger detection signal; and (iii) using the passenger detection signal to control an operation of the escalator system 12. In some embodiments, step (iii) can include automatically switching the escalator system 12 between one or more operation modes (e.g., shutdown mode, standby mode, running mode).

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A detector for use in a passenger conveyor system, comprising:
    a structured light source operable to project light into a detection area in a predetermined projected pattern;
    a structured light detector operable to generate reflected light signals indicative of light reflected back toward the structured light detector from the detection area;
    a controller operable to receive the reflected light signals from the structured light detector;
    the controller is operable to process the reflected light signals to determine a reflected pattern;
    the controller is operable to compare the reflected pattern and the predetermined projected pattern to generate pattern comparison information;
    the controller is operable to analyze the pattern comparison information to provide depth information about an object in the detection area; and
    the controller is operable to control an operation of the conveyor system based on the depth information.

2. The detector of claim 1, wherein the conveyor system is one of an escalator system and a moving sidewalk system.

3. The detector of claim 1, wherein the detection area includes at least one of an area of the conveyor system and an area proximate the conveyor system.

4. The detector of claim 1, wherein the controller is operable to process the reflected light signals to make a determination as to whether the object is present on the conveyor system.

5. The detector of claim 1, wherein the controller is operable to process the reflected light signals to make a determination as to whether the object disposed within the detection area is approaching the conveyor system.

6. The detector of claim 1, wherein the controller is operable to process the reflected light signals to make a determination as to whether the object disposed within the detection area is moving away from the conveyor system.

7. The detector of claim 1, wherein the light has at least one predetermined wavelength.

8. The detector of claim 1, wherein the light has predetermined wavelengths in an infrared range.

9. The detector of claim 1, wherein the predetermined pattern is at least one of a strip pattern, a grid pattern, and a dot pattern.

10. The detector of claim 1, further comprising a camera operable to receive visible light that has been reflected from the detection area toward the camera, and operable to convert the received visible light into electrical visible light signals.

11. The detector of claim 1, wherein the controller is operable to determine movement information about the object based on the depth information.

12. The detector of claim 11, wherein the controller is operable to transform the depth information and transform the movement information to correspond with a coordinate system of an environment in which the conveyor system is disposed, and wherein the controller is configured to generate tracking information relative to the object using the transformed depth information and the transformed movement information to determine at least one characteristic of a movement of the object, and wherein the at least one characteristic includes at least one of a location, a speed, or a direction.

13. The detector of claim 12, wherein the controller is configured to generate the tracking information by detecting the object at consecutive detection frames based on three-dimensional positions of the object relative to the coordinate system.

14. The detector of claim 12, wherein the controller is operable to control the operation of the conveyor system based on the at least one characteristic.

15. A method for controlling a conveyor system, comprising:
projecting structured light having a predetermined projected pattern within a detection area disposed relative to the conveyor system;
detecting structured light reflected back from the detection area;
processing the detected light to determine a reflected pattern;
comparing the reflected pattern and the predetermined projected pattern to generate pattern comparison information;
analyzing the pattern comparison information to provide depth information about an object in the detection area; and
controlling an operation of the conveyor system based on the depth information.

16. The method of claim 15, wherein the conveyor system is one of an escalator system and a moving sidewalk system.

17. The method of claim 15, wherein the detection area includes at least one of an area of the conveyor system and an area proximate the conveyor system.

18. The method of claim 15, wherein the comparing further indicates whether the object is present on the conveyor system.

19. The method of claim 15, wherein the determination further indicates whether the object disposed within the detection area is approaching the conveyor system.

20. The method of claim 15, wherein the determination further indicates whether the object disposed within the detection area is moving away from the conveyor system.

21. The method of claim 15, wherein the step of controlling an operation of the conveyor system involves automatically switching an operation mode of the conveyor system between at least one of a shutdown mode, a standby mode, and a running mode.

22. An object detector, comprising:
first and second structured light sources, each being operable to project light having a predetermined projected pattern into a detection area;
first and second structured light detectors operable to generate reflected light signals indicative of light reflected back toward the first and second structured light detectors from the detection area;
a controller operable to receive the reflected light signals from the first and second structured light detectors;
the controller is operable to process the reflected light signals from the first and second structured light detectors to determine reflected patterns;
the controller is operable to compare the reflected patterns and the predetermined projected patterns to generate pattern comparison information;
the controller is operable to analyze the pattern comparison information to provide depth information about an object in the detection area; and
the controller is operable to control an operation of an object conveyor system based on the depth information.

23. The object detector of claim 22, further comprising:
an interference elimination feature operable to ensure that the first structured light detector receives only light that has been projected by the first structured light source and reflected back towards the first structured light detector, and operable to ensure that the second structured light detector receives only light that has been projected by the second structured light source and reflected back towards the second structured light detector.

24. The object detector of claim 22, wherein the interference elimination feature alternatingly activates and deactivates the first and second structured light sources at mutually exclusive time intervals.

25. The object detector of claim 22, wherein the interference elimination feature causes each of the first and second structured light sources to project light at a different wavelength, or within a different wavelength range.

26. The object detector of claim 22, wherein the interference elimination feature acquires time-of-flight information of light travelling between the first and second structured light sources and the respective first and second structured light detectors.

* * * * *

UNITED STATES PATENT AND TRADEMARK OFFICE
CERTIFICATE OF CORRECTION

PATENT NO.        : 9,896,309 B2
APPLICATION NO.   : 15/302263
DATED             : February 20, 2018
INVENTOR(S)       : Wang et al.

It is certified that error appears in the above-identified patent and that said Letters Patent is hereby corrected as shown below:

In the Claims

Column 10, Line 28, please delete "passenger".

Signed and Sealed this
Third Day of April, 2018

Andrei Iancu
*Director of the United States Patent and Trademark Office*